US012761834B2

(12) United States Patent
Park et al.

(10) Patent No.: US 12,761,834 B2
(45) Date of Patent: Oct. 13, 2026

(54) CHIPLET-BASED STORAGE DEVICE AND METHOD OF TRANSMITTING CONTROL CODES TO CHIPLET

(71) Applicant: SK hynix Inc., Icheon-si (KR)

(72) Inventors: Ie Ryung Park, Icheon-si (KR); Joo Hyung Kim, Icheon-si (KR); Dong Sop Lee, Icheon-si (KR); Tae Ho Lim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 199 days.

(21) Appl. No.: 18/447,981

(22) Filed: Aug. 10, 2023

(65) Prior Publication Data

US 2024/0289054 A1 Aug. 29, 2024

(30) Foreign Application Priority Data

Feb. 28, 2023 (KR) ........................ 10-2023-0027146

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
See application file for complete search history.

(56) References Cited

U.S. PATENT DOCUMENTS

2019/0341091 A1* 11/2019 Sity ..................... G06F 11/1658
2020/0186455 A1* 6/2020 Lokhandwala ....... H04L 43/103
2021/0117366 A1 4/2021 Zhang et al.
2023/0058989 A1* 2/2023 Hammarlund ...... G06F 12/0831
2023/0236889 A1* 7/2023 Gupta .................. G06F 9/3877 712/28

FOREIGN PATENT DOCUMENTS

KR 20170086345 A 7/2017

* cited by examiner

*Primary Examiner* — Prasith Thammavong
(74) *Attorney, Agent, or Firm* — Ashurst Perkins Coie US LLP

(57) ABSTRACT

Provided is a method by which a second chip obtains a control code such as firmware in a memory controller having a chiplet-based structure. The memory controller includes a first chip configured to perform a first operation, a plurality of second chips configured to perform a second operation, a plurality of data links configured to connect the first chip and each of the plurality of second chips on a one-to-one basis and used for data transmission between the first chip and each of the plurality of second chips during normal operation after booting, a control link connected to the first chip and all the plurality of second chips and used to transmit a control code for performing the second operation of the plurality of second chips, and a memory connected to the first chip to store the control code of the plurality of second chips.

8 Claims, 10 Drawing Sheets

FIG. 9

| | SECOND INDEX | FIRST INDEX | DATA |
|---|---|---|---|
| FIRST CONTROL CODE | 0 | 0 | D0 |
| | | 1 | D1 |
| | | 2 | D2 |
| | | | |
| | | K | DK |
| SECOND CONTROL CODE | 1 | 0 | DD0 |
| | | 1 | DD1 |
| | | 2 | DD2 |
| | | | |
| | | M | DDM |

CHIPLET-BASED STORAGE DEVICE AND METHOD OF TRANSMITTING CONTROL CODES TO CHIPLET

CROSS REFERENCE TO RELATED APPLICATION

This patent document claims the priority and benefits of Korean Patent Application No. 10-2023-0027146, filed at the Korean Intellectual Property Office on Feb. 28, 2023, the entire contents of which are incorporated herein by reference for all purposes.

TECHNICAL FIELD

Various embodiments of the present disclosure relate to a chiplet-based storage device and a method of transmitting control codes to a chiplet.

BACKGROUND

A storage device is a device capable of storing data based on a request from an external device such as a computer, a mobile terminal such as a smart phone or tablet, or various electronic devices.

The storage device may include a memory and a memory controller for controlling the memory. The memory controller may receive a command from the external device and perform or control operations for reading data from the memory, writing data to the memory/performing programming of data, or erasing data from the memory based on the received command.

SUMMARY

Various embodiments of the present disclosure provide a method of transmitting control codes such as firmware of each chiplet in a memory controller having a chiplet-based structure.

The technical tasks to be achieved in the present disclosure are not limited to the technical tasks mentioned above, and other technical tasks not mentioned can be clearly understood by those of ordinary skill in the art to which the present disclosure belongs from the description below.

In one aspect, a memory controller includes a first chip (e.g., front-end chip 210) configured to perform a first operation of the memory controller, a plurality of second chips (e.g., back-end chip 220) configured to perform a second operation of the memory controller, a plurality of data links configured to connect the first chip and each of the plurality of second chips on a one-to-one basis and provide data transmission between the first chip and each of the plurality of second chips, a control link connected to the first chip and all the plurality of second chips and configured to transmit control codes for performing the second operation of the plurality of second chips, and a memory connected to the first chip and configured to store the control codes. In some implementations, the first chip may obtain the control code of the plurality of second chips from the memory, and transmit the control code to the plurality of second chips through the control link, and repeatedly transmit the control code until a reception completion message for the control code is received from all of the plurality of second chips.

In another aspect, a memory controller includes a first chip configured to perform a first operation of the memory controller, a second chip configured to perform a second operation of the memory controller, a third hip configured to perform a third operation of the memory controller, a first data link configured to connect the first chip and the second chip on a one-to-one basis and provide data transmission between the first chip and the second chip, a second data link configured to connect the first chip and the third chip on a one-to-one basis and provide data transmission between the first chip and the third chip, a control link connected to the first chip, the second chip, and the third chip to transmit a first control code for performing the second operation of the second chip and a second control code for performing the third operation of the third chip, and a memory connected to the first chip and configured to store the first control code and the second control code. In some implementations, the first chip may obtain the first control code and the second control code, and repeatedly transmit the first control code and the second control code through the control link.

In another aspect, a method of a memory controller includes obtaining, by a first chip included in the memory controller, a control code for performing an operation of a second chip included in the memory controller from a memory connected to the first chip, transmitting, by the first chip, the control code to all of a plurality of second chips connected through a control link, determining, by the first chip, whether a reception completion message indicating that the control code has been received from all of the plurality of second chips, and repeatedly transmitting, by the first chip, the control code to the plurality of second chips connected to the control link in response to a determination by the first chip that the reception completion message has not been received from at least one of the plurality of second chips.

BRIEF DESCRIPTION OF THE DRAWINGS

FIG. 9 is a diagram showing an example of a structure of a control code based on an embodiment of the present disclosure.

DETAILED DESCRIPTION

Various embodiments of the present disclosure relate to a chiplet-based storage device and a method of transmitting control codes to a caplet. The memory controller is configured to support memory interfaces of various specifications, but in the case of using a conventional single skeleton integrated circuit or a single system-on-chip (SoC), there is a limit in supporting memory interfaces of various specifications. Some embodiments of the present disclosure provide a memory controller having a chiplet-based structure which can support memory interfaces of various specification.

Hereinafter, embodiments will be described with reference to the accompanying drawings. Herein, when it is mentioned that a component (or an area, a layer, a part, etc.) is "on", "connected to", or "coupled to" another component, it may mean that the component may be directly connected/coupled to the other component or a third component may be disposed therebetween.

Hereinafter, embodiments of the present disclosure will be described in detail with reference to the accompanying drawings.

Figure 1:
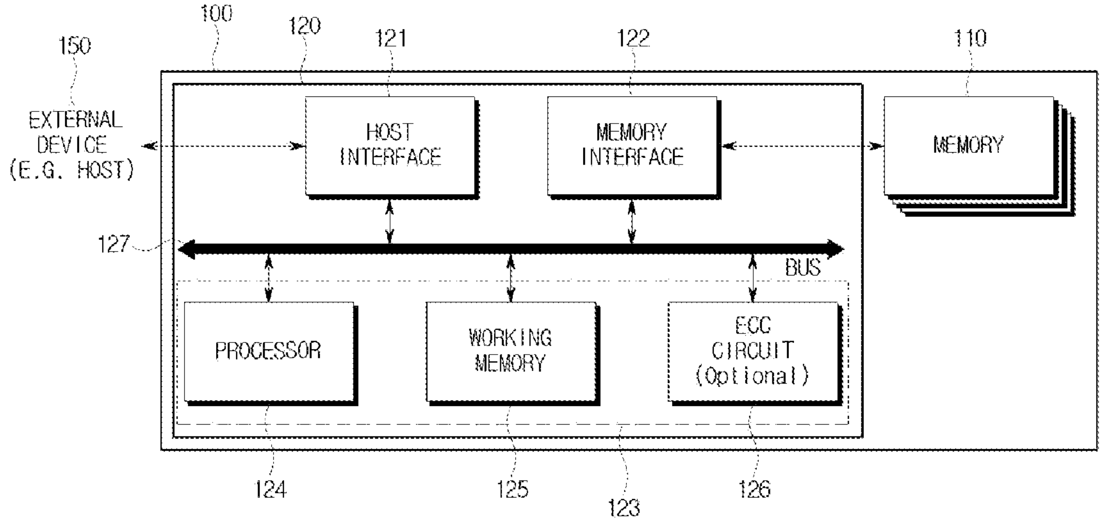
FIG. 1 is an example of a diagram schematically illustrating a configuration of a storage device based on various embodiments of the present disclosure.

FIG. 1 is an example of a diagram schematically illustrating a configuration of a storage device 100 based on various embodiments of the present disclosure.

Referring to FIG. 1, a storage device 100 according to embodiments of the present disclosure may include a memory 110 that stores data and a controller 120 that controls the memory 110. When needed, additional components may be further included in the storage device 100.

The memory 110 may operate in response to control of the controller 120. Here, the operation of the memory 110 may include, for example, a read operation, a program operation (also referred to as "write operation"), and an erase operation.

For example, the memory 110 may include various types of non-volatile memories, such as NAND flash memory, 3D NAND flash memory, NOR flash memory, resistive random access memory (RRAM), Phase-Change Memory (PRAM), Magnetoresistive Random Access Memory (MRAM), Ferroelectric Random Access Memory (FRAM), Spin Transfer Torque Random Access Memory (STT-RAM), or others.

The memory 110 may be implemented as a three-dimensional array structure. The embodiments of the present disclosure may be applied not only to a flash memory in which a charge storage layer is made of a conductive floating gate, but also to a charge trap flash (CTF) in which a charge storage layer is made of an insulating film.

The memory 110 may also include a plurality of chips or cores, and according to an embodiment, each of the plurality of chips may have a different interface for communication with the controller 120.

The memory 110 may receive a command, an address, and/or others from the controller 120 (also referred to as a memory controller), and access a region of a memory cell array selected by the address. Thus, the memory 110 may perform an operation indicated by a command on the region selected by the address.

For example, the memory 110 may perform at least one of a program operation, a read operation, or an erase operation. During a program operation, the memory 110 may program data in the region selected by the address. During a read operation, the memory 110 may read data from the region selected by the address. During an erase operation, the memory 110 may erase data stored in the region selected by the address.

The controller 120 may control program (write), read, erase, and background operations with respect to the memory 110. Here, the background operation may include one or more of Garbage Collection (GC), Wear Leveling (WL), Read Reclaim (RR), or Bad Block Management (BBM) operations.

The controller 120 may control an operation of the memory 110 according to a request from an external device (e.g., a host) located outside the storage device 100. The operation of the memory 110 may be controlled according to a request from the host. In some other embodiments, the controller 120 may control an operation of the memory 110 regardless of a request from an external device.

The external device may include a computer, a UMPC (Ultra Mobile PC), a workstation, a PDA (Personal Digital Assistant), a tablet, a mobile phone, a smart phone, an e-book, a PMP (portable multimedia player), a portable game machine, a navigation device, a black box, a digital camera, a DMB (Digital Multimedia Broadcasting) player, a smart television, a digital audio recorder, a digital audio player, a digital picture recorder, a digital picture player, a digital video recorder, a digital video player, a storage constituting a data center, one of various electronic devices constituting a home network, one of various electronic devices constituting a computer network, one of various electronic devices constituting a telematics network, a radio frequency identification (RFID) device, a mobility device (e.g., vehicle, robot, drone) that travels on the ground, water, or air under human control or autonomously travels, or others.

The external device may include at least one operating system (OS). The operating system may generally manage and control functions and operations of the external device, and provide mutual operation between the external device and the storage device 100. The operating system may be classified into a general operating system and a mobile operating system according to the mobility of an external device.

The controller 120 and an external device may be separate devices. In some cases, the controller 120 and the external device may be implemented as an integrated device. Hereinafter, for convenience of description, a description will be given by taking, as an example, a case in which the controller 120 and an external device are separate devices will be described.

Referring to FIG. 1, the controller 120 may include a host interface 121, a memory interface 122, a control circuit 123 and other components or circuits.

The host interface 121 may provide an interface for communication with an external device. For example, the host interface 121 may include an interface using at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, an SCSI (small computer small interface) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, a proprietary protocol, or others.

The memory interface 122 may be connected to the memory 110 to provide an interface for communication with the memory 110. That is, the memory interface 122 may be configured to provide an interface between the memory 110 and the controller 120 in response to control by the control circuit 123.

The control circuit 123 may receive a command through the host interface 121 and perform an operation for processing the received command.

The control circuit 123 may control the operation of the memory 110 by performing overall control operations of the controller 120. To this end, according to an embodiment, the control circuit 123 may include a processor 124, and may also include a working memory 125 and/or an error detection and correction circuit (ECC Circuit) 126 optionally.

The processor 124 may control overall operation of the controller 120.

The processor 124 may communicate with an external device through the host interface 121 and communicate with the memory 110 through the memory interface 122.

The processor 124 may perform a function of a Flash Translation Layer (FTL). The processor 124 may translate a logical address provided by an external device into a physical address through a flash translation layer (FTL). The flash translation layer may receive a logical address and translate the logical address into a physical address using a mapping table. Here, the logical address and the physical address may be a logical block address or a physical block address representing one memo area.

There are several methods for address mapping of the flash translation layer according to mapping units. Representative address mapping methods may include a page mapping method, a block mapping method, and a hybrid mapping method.

The processor 124 may randomize data received from an external device. For example, the processor 124 may randomize data received from an external device using a set randomizing seed. The randomized data may be provided to the memory 110 and programmed in the memory 110.

The processor 124 may de-randomize data received from the memory 110 during a read operation. For example, the processor 124 may derandomize data received from the memory 110 using a de-randomizing seed. The de-randomized data may be output to the external device.

The processor 124 may perform background functions for the memory 110 such as a garbage collection (GC) function, a wear leveling (WL) function, and a bad block management function.

The garbage collection function may refer to a function of collecting pieces of data partially recorded in memory blocks and moving and recording the data to and in another memory block in order to secure a free space to record data when there is not enough space to record data in the memory 110.

The wear leveling function may be a function for evenly writing data to all memory blocks of the memory 110 to prevent excessive use of a specific block in order to prevent errors and data loss of the memory 110 in advance and improve durability and stability of a product.

The bad block management function may be a function of detecting a bad block in the memory 110 and, when there is a reserved block, preventing data from being written to the bad block by replacing the bad block with the reserved block.

The processor 124 may control the operation of the controller 120 by executing firmware. In other words, the processor 124 may control overall operations of the controller 120 and execute (drive) firmware stored in the working memory 125 during booting. Hereinafter, the operation of the storage device 100 to be described in the embodiments of the present disclosure may be implemented in a manner in which the processor 124 executes firmware in which a corresponding operation is defined.

The firmware is a program executed in the storage device 100 to drive the storage device 100 and may include various functional layers. For example, the firmware may include binary data in which a code for executing each of the above-described functional layers is defined.

For example, the firmware may include a flash translation layer that performs a translation function between a logical address for transmission from an external device to the storage device 100 and a physical address of the memory 110, a host interface layer (HIL) that interprets a command received from an external device through the host interface 121 and transfers the command to a flash translation layer, and a flash Interface layer (FIL) that transfers a command instructed by the flash translation layer to the memory 110.

Also, the firmware may include a garbage collection function, a wear leveling function, and a bad block management function.

The firmware may be loaded into the working memory 125 from, for example, the memory 110 or a separate non-volatile memory (e.g., ROM, NOR Flash) located outside the memory 110. When executing a booting operation after power-on, the processor 124 may first load all or part of the firmware into the working memory 125.

The processor 124 may perform logic operations defined in firmware loaded into the working memory 125 to control the overall operation of the controller 120. The processor 124 may store a result of performing the logic operation defined in the firmware in the working memory 125. The processor 124 may allow the controller 120 to generate a command or a signal according to the result of performing the logic operation defined in the firmware. When the part of the firmware in which the logical operation to be performed is defined is not loaded into the working memory 125, the processor 124 may generate an event (e.g., interrupt) for loading the corresponding part of the firmware into the working memory 125.

The processor 124 may load meta data required to drive the firmware from the memory 110. The meta data is data for managing the memory 110 and may include management information about user data stored in the memory 110.

The firmware may be updated while the storage device 100 is being produced or the storage device 100 is running. The controller 120 may download new firmware from the outside of the storage device 100 and update existing firmware to new firmware.

The working memory 125 may store firmware, program codes, commands, or data required to drive the controller 120. The working memory 125 is, for example, a volatile memory, and may include one or more of static RAM (SRAM), dynamic RAM (DRAM), and synchronous DRAM (SDRAM).

An error detection and correction circuit 126 may detect an error bit of target data using an error correction code and correct the detected error bit. Here, the target data may be, for example, data stored in the working memory 125 or data read from the memory 110.

The error detection and correction circuitry 126 may be implemented to decode data with an error correction code.

The error detection and correction circuitry 126 may be implemented with a variety of decoders. For example, a decoder performing non-systematic decoding or a decoder performing systematic decoding may be used.

For example, the error detection and correction circuitry 126 may detect an error bit in units of sectors set for each read data. That is, each read data may be composed of a plurality of sectors. A sector may refer to a data unit smaller than a page, which is a read unit of a flash memory. Sectors constituting each read data may be associated with each other through addresses.

The error detection and correction circuit 126 may calculate a bit error rate (BER) and determine whether correction is possible in units of sectors. For example, when the bit error rate (BER) is higher than a set reference value, the error detection and correction circuit 126 may determine that a corresponding sector is uncorrectable or fail. On the other hand, when the bit error rate (BER) is lower than the reference value, the error detection and correction circuit 126 may determine that a corresponding sector is correctable or pass.

The error detection and correction circuit 126 may perform error detection and correction operation on all pieces of read data, sequentially. When a sector included in read data is correctable, the error detection and correction circuit 126 may omit an error detection and correction operation for a corresponding sector of next read data. When the error detection and correction operation has been performed on for all pieces of read data, the error detection and correction circuit 126 may detect sectors finally determined to be uncorrectable. The number of sectors determined to be uncorrectable may be one or more. The error detection and correction circuit 126 may transfer information (e.g., address information) on sectors determined to be uncorrectable to the processor 124.

The bus 127 may be configured to provide a channel between the components 121, 122, 124, 125, and 126 of the controller 120. The bus 127 may include, for example, a control bus for transferring various control signals, commands, and/or others, and a data bus for transferring a variety of data.

On the other hand, some of the aforementioned components 121, 122, 124, 125, and 126 of the controller 120 may be deleted, or the aforementioned components 121, 122, 124, 125, and 126 of the controller 120 may be integrated into one component. In some cases, one or more other components may be added in addition to the above-described components of the controller 120.

Figure 2:
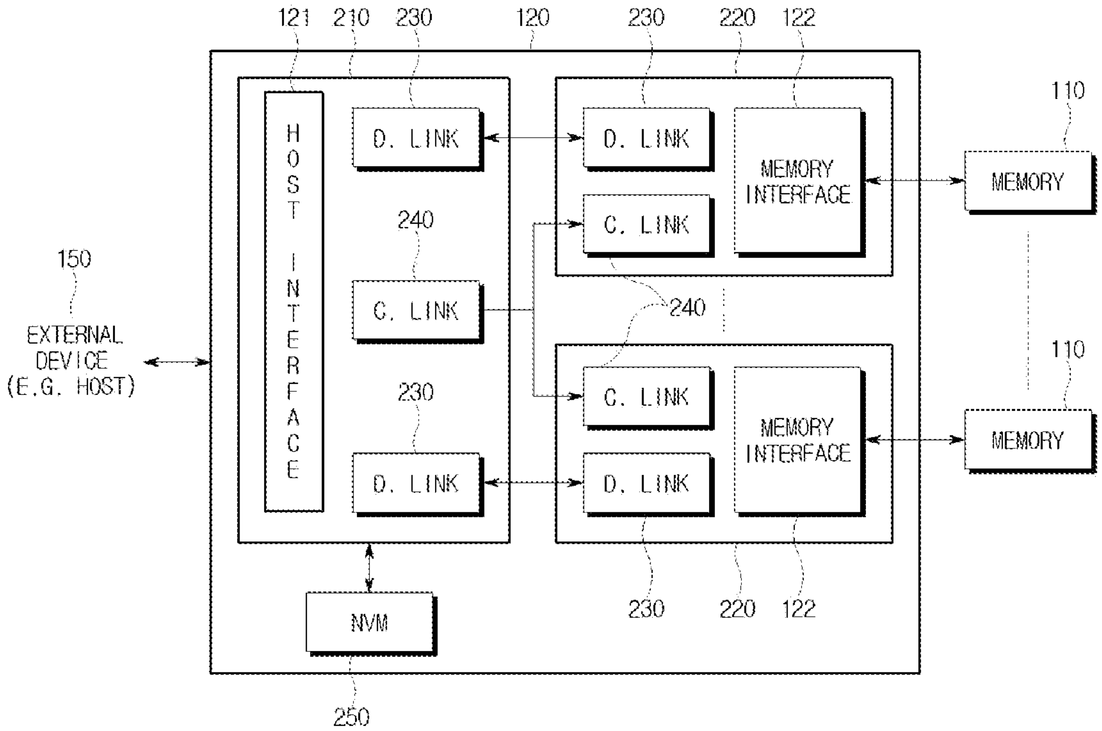
FIG. 2 is an example of a block diagram illustrating a chiplet-based structure of a controller based on various embodiments of the present disclosure.

FIG. 2 is an example of a block diagram illustrating a chiplet-based structure of a controller 120 based on various embodiments of the present disclosure, wherein different semiconductor chips or chiplets may be integrated on a supporting substrate to form the controller 120 in a chiplet-based structure. Such different semiconductor chips or chiplets may be different monolithically formed semiconductor integrated circuits, processors, or modules and this chiplet-based structure enables integration of functions or operations of separate chiplets into the controller 120 without monolithically integrating circuitry and functions of those separate chiplets into one monolithic semiconductor chip. Links or communications between different chiplets may be implemented via interposers or other suitable inter-chip interfacing and connecting mechanisms.

Referring to FIG. 2, the controller 120 may include different chiplets on a supporting substrate for the controller 120 including, for example, a front-end chip 210 on the supporting substrate to interface with and communicate with the external device 150 such as a host and a plurality of back-end chips 220 that are on the supporting substrate and coupled to communicate with the front-end chip 210. One or more memory cores 110 outside the controller can be coupled to the controller 120.

Although only two back-end chips 220 are shown in FIG. 2 (and other figures), this is just one example, and a larger number of back-end chips 220 may be included as components of the chiplet-based controller 120 in various embodiments. According to one embodiment, the number of back-end chips 220 may be the same as the number of memory 110 chips or the number of memory 110 cores connected to the chiplet-based controller 120, and each back-end chip 220 may be connected to one memory 110 chip to transmit a control signal for writing data into the memory 110 or reading data from the memory 110.

In an embodiment, the front-end chip 210 may be a chip including the host interface 121, the processor 124, the error detection and correction circuit 126, and/or others of FIG. 1 and the back-end chip 220 may include the memory interface 122 of FIG. 1. The working memory 125 of FIG. 1 may be provided as a separate chip (not shown) and connected to the front-end chip 210.

The front-end chip 210 and the back-end chips 220 may be configured in a chiplet structure. The front-end chip 210 and the back-end chips 220 may have physically-separated chip structures so as to function independently of each other, and may transmit data and signals through a bus between the chips. In general, the external device 150 may operate at a higher speed than the memory 110. Accordingly, the front-end chip 210 may be configured to support high-speed communication with the external device 150. On the other hand, the back-end chips 220 may be configured to support low-speed communication with the memory 110. According to various embodiments of the present disclosure, "high speed" and "low speed" are merely used to express a relative speed difference, and do not mean absolute speeds.

The front-end chip 210 may include a host interface 121 for communication with a host device. Also, the front-end chip 210 may also include links 230 and 240 for communication with the back-end chips 220. The back-end chips 220 may include links 230 and 240 for communication with the front-end chip 210, respectively.

The controller 120 with the chiplet-based structure as described above may flexibly replace the back-end chips 220 according to an interface of the memory 110 connected thereto, and also flexibly replace only the front-end chip 210 according to a host interface supported by the external device 150, thus resulting in a controller structure capable of flexibly responding to various requirements.

Referring to FIG. 2, the front-end chip 210 and the back-end chip 220 may communicate with each other using a data link (D.LINK) 230 and a control link (C.LINK) 240. The back-end chip 220 includes one data link 230 and one control link 240, while the front-end chip 210 includes one control link 240 and the number of data links 230 corresponding to the number of the back-end chips 220. The data links (D.LINK) 230 of the front-end chip 210 may communicate with the data links (D.LINK) 230 of the back-end chips 220, respectively.

The data link 230 may be used to transmit data to be written to or read from the memory 110 and to transmit related control data during normal operation of the controller 120. The normal operation may refer to an operation of the memory controller, which is performed after booting.

The control link 240 may be used to transmit a control code such as firmware for normally operating the functions of the back-end chip 220 when the controller 120 is newly powered and booted and may not be used after booting is completed. The front-end chip 210 may read firmware for the back-end chip 220 stored in a non-volatile memory 250 and transmit the firmware to the back-end chip 220 via the control link 240 and the back-end chip 220 may execute the firmware received via the control link 240, so that booting is completed.

In an embodiment, the control link 240 may connect the front-end chip 210 and all the back-end chips 220 using a single physical line. In addition, in an embodiment, the control link 240 may be implemented as one-way communication means via which only the front-end chip 210 is able to transmit data and all of the back-end chips 220 are able to only receive a control code. However, this is only one embodiment, and other embodiments are also possible. Thus, in another embodiment, the control link 240 may be implemented to enable bi-directional communication, which may increase implementation complexity and protocol complexity in the case of transmitting a control code.

Figure 3:
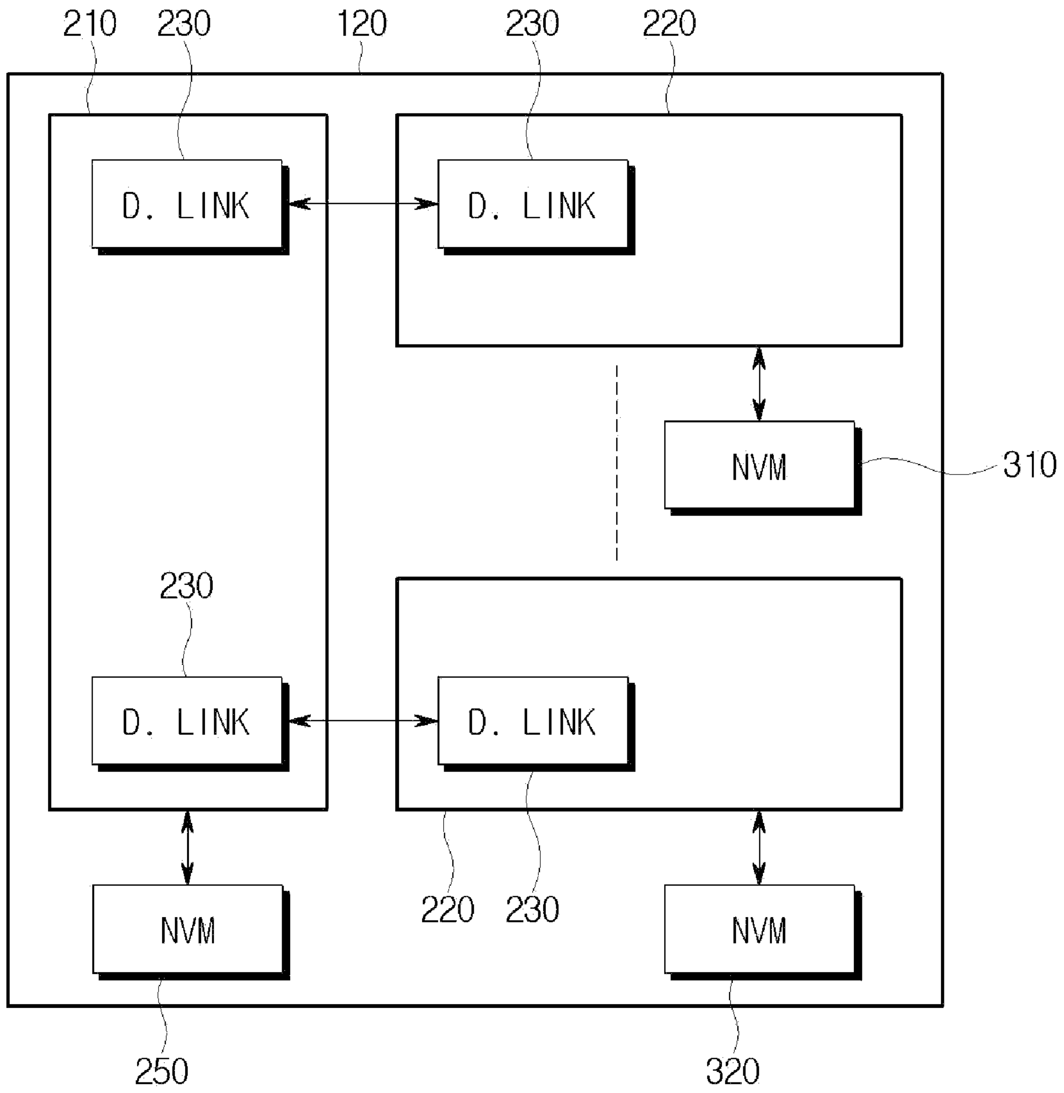
FIG. 3 shows a diagram illustrating an example of a method of obtaining control codes in back-end chips from non-volatile memories directly connected to the back-end chips.

FIGS. 3 to 5 are diagrams illustrating examples of a method of obtaining a control code in the back-end chip 220.

In FIGS. 3 to 5, only blocks necessary for description are shown for convenience of description, and other blocks are omitted.

FIG. 3 shows a diagram illustrating an example of a method of obtaining control codes (firmware) in back-end chips from non-volatile memories (e.g., serial flashes) directly connected to the back-end chips 220.

Referring to FIG. 3, when power is applied or a reset occurs, the front-end chip 210 and each of the plurality of back-end chips 220 may read a control code (firmware) from the non-volatile memories 250, 310, and 320 connected to the front-end hip 210 and the back-end chips 220 to perform booting. In this case, since as many non-volatile memories as the number of back-end chips 220 are required, there may be overhead in terms of cost and area.

Figure 4A:
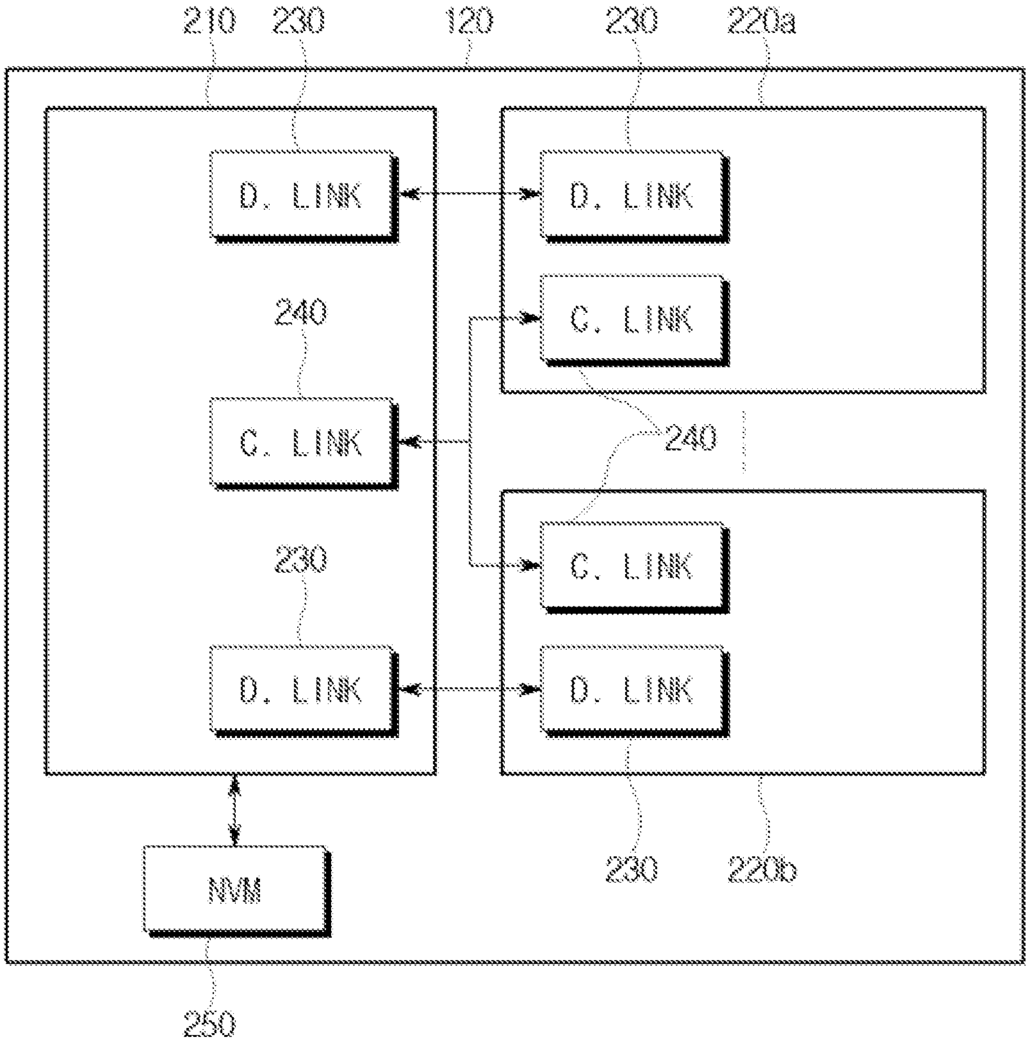
FIGS. 4A and 4B show diagrams illustrating an example of a method of obtaining control codes in back-end chips from a non-volatile memory connected to a front-end chip.
Figure 4B:
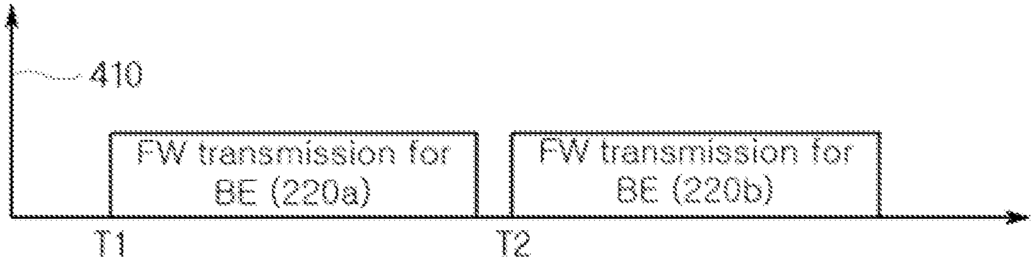

FIGS. 4A and 4B show diagrams illustrating an example of a method of obtaining control codes (firmware) in back-end chips 220*a* and 220*b* from a non-volatile memory connected to a front-end chip 110.

Referring to FIG. 4A, the front-end chip 210 may obtain control codes for the back-end chips 220*a* and 220*b* from the non-volatile memory 250 connected to the front end-chip 210. The front-end chip 210 may transmit, to the back-end chips 220*a* and 220*b*, the control codes sequentially as shown in FIG. 4B. For example, the front-end chip 210 may transmit the control code of the back-end chip 220*a* at time T1 and the control code of the back-end chip 220*b* at time T2. In this case, there may be a temporal overhead until transmission of control codes to all of the back-end chips 220*a* and 220*b* is completed.

In addition, the front-end chip 210 may require additional control to transmit data after identifying whether the back-end chips 220*a* and 220*b* to which the front-end chip 210 is to transmit data are ready to receive data. Additionally, the back-end chips 220*a* and 220*b* may require logic to determine whether the control code currently being received is for the back-end chip 220*a* or 220*b* itself or for another back-end chip. Accordingly, additional control may be required for synchronization between the front-end chip 210 and the back-end chips 220*a* and 220*b*.

Due to the need for such additional control, the control link 240 between the front-end chip 210 and the back-end chips 220*a* and 220*b* may need to perform bi-directional communication as shown in FIG. 4A.

Figure 5A:
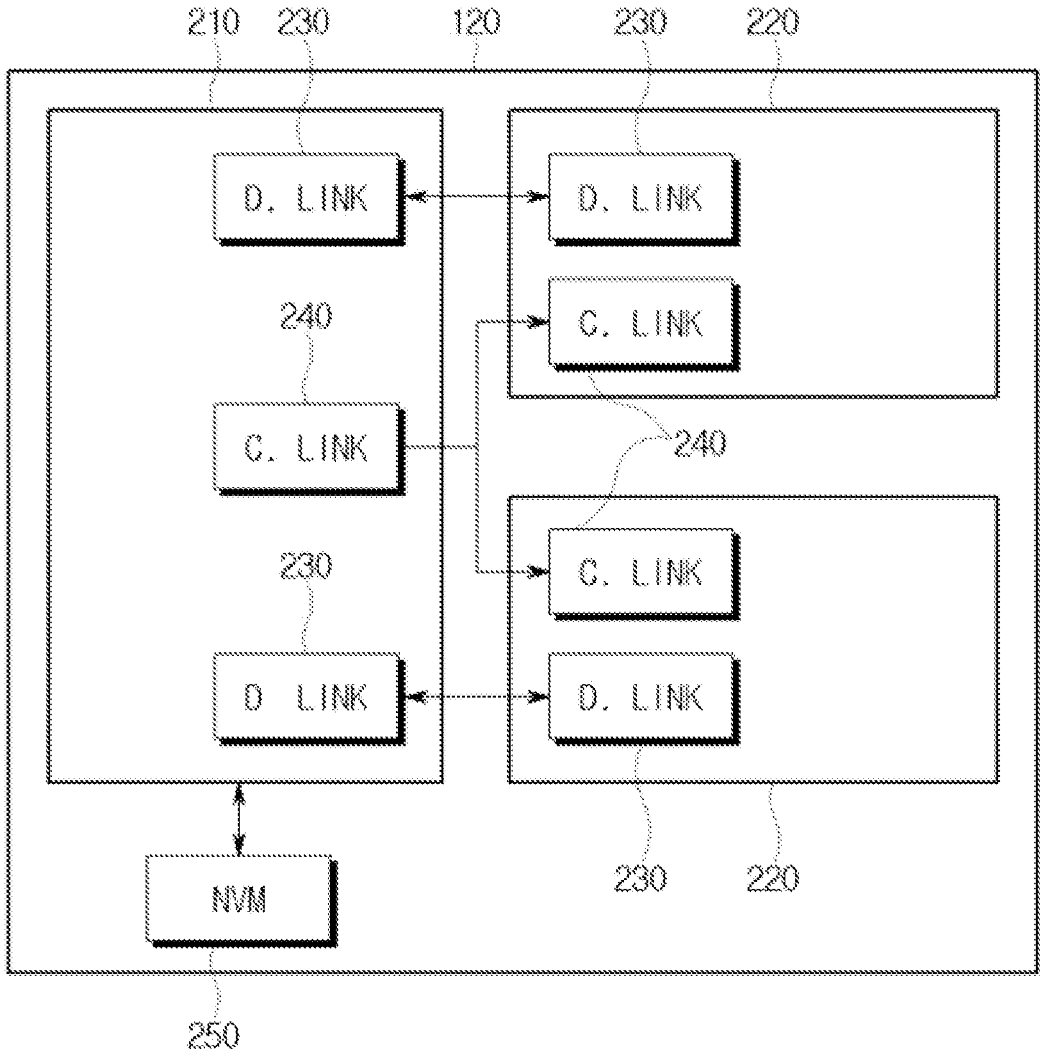
FIGS. 5A and 5B show diagrams illustrating an example of a method of obtaining control codes in back-end chips from a non-volatile memory connected to a front-end chip based on various embodiments of the present disclosure.
Figure 5B:
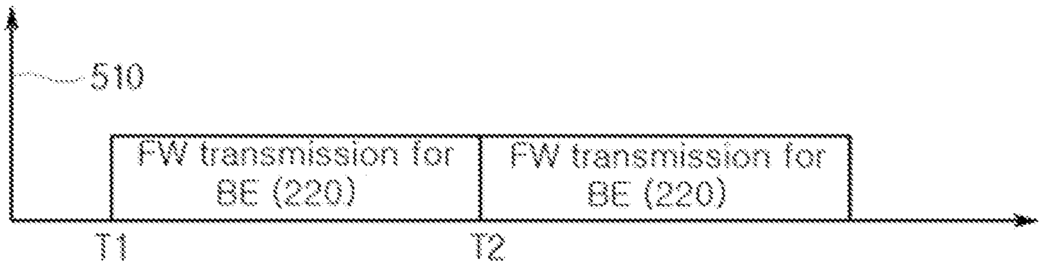

FIGS. 5A and 5B show diagrams illustrating an example of a method of obtaining control codes in back-end chips 220 from a non-volatile memory connected to a front-end chip 210 based on various embodiments of the present disclosure.

In the example of FIG. 5A, only one-way communication from the front-end chip 210 to the back-end chip 220 may be enabled through the control link 240 unlike the example as shown in FIG. 4A. In addition, the front-end chip 210 may repeatedly transmit a control code (firmware) for the back-end chip 220 to all of the plurality of back-end chips 220 at the same time as shown in FIG. 5B. After power is applied to the front-end chip 210, the front-end chip 210 may transmit the control code for the back-end chip 220 regardless of the power-on of the back-end chips 220. For example, the front-end chip 210 transmits, at T1, the control code to all of the plurality of back-end chips 220, and repeats, at T2, the transmission of the control code to all of the plurality of back-end chips 220. In this case, even when power is applied to the back-end chip 220 in the middle of transmission of the control code, the back-end chip 220 may receive the control code from the middle part of the control code and receive the front part of the control code, which have not been received, during the next repeated transmission to finish reception of the entire control code. Therefore, there is no need for synchronization between the front-end chip 210 and the back-end chip 220, and there is no need for the front-end chip 210 to determine whether the back-end chip 220 is ready to receive data, thus simplifying the transmission protocol of the control code.

Figure 6:
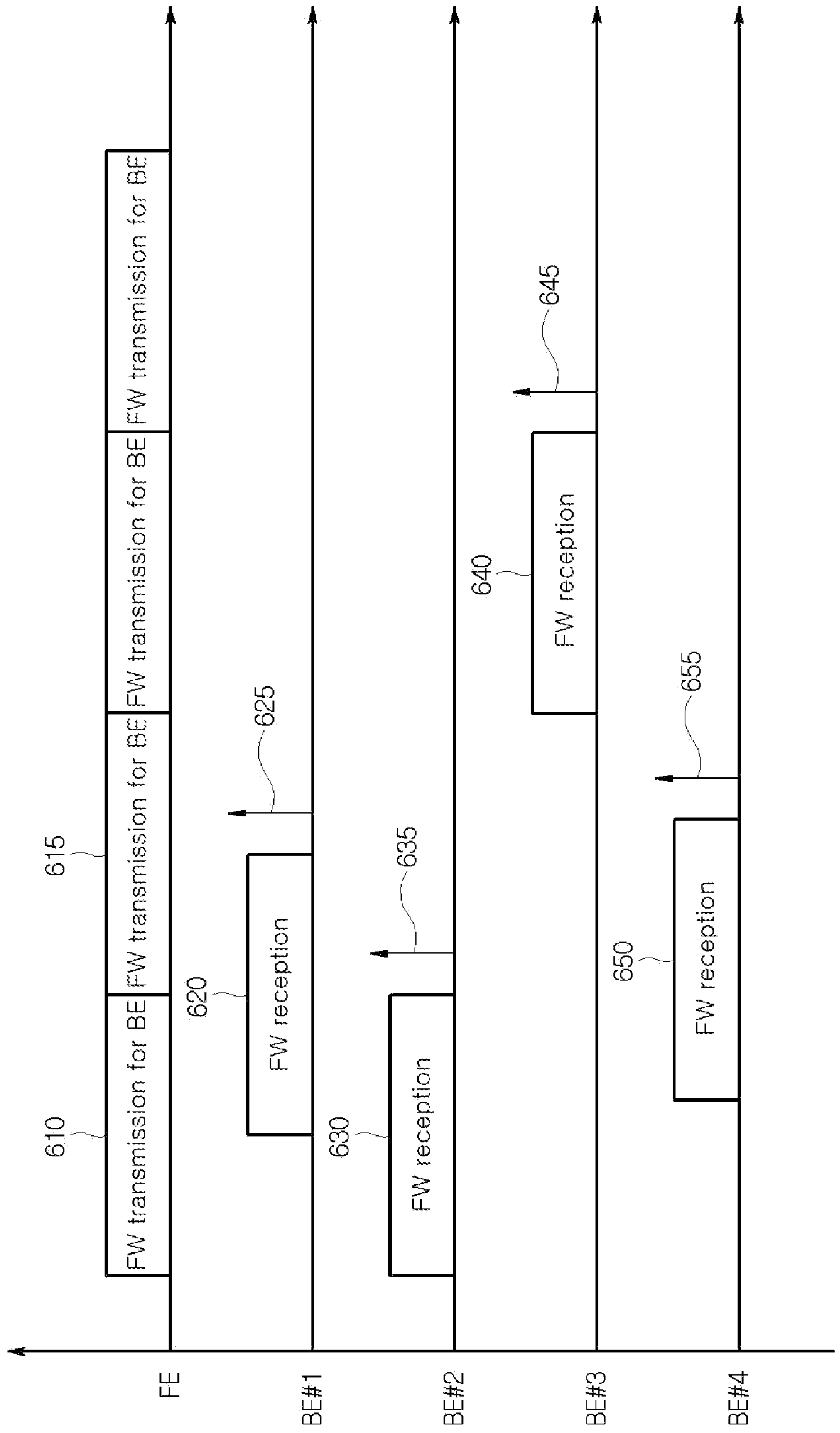
FIG. 6 is an example of a timing diagram for receiving a control code in a plurality of back-end chips based on an embodiment of the present disclosure.

FIG. 6 is an example of a timing diagram for receiving a control code in a plurality of back-end chips based on an embodiment of the present disclosure.

Referring to FIG. 6, the front-end chip FE may obtain a control code FW for a back-end chip BE from the non-volatile memory 250 and transmit the control code 610 to the plurality of second-end chips BE #1, BE #2, BE #3, and BE #4. The front-end chip FE may receive a message indicating that the control code has been received from each back-end chip BE. In an embodiment, a reception completion message for the control code may be transmitted from the back-end chip BE to the front-end chip FE through the data link 230. For example, the back-end chip BE may transmit, to the front-end chip FE, a message indicating that booting is completed, a ready message indicating that normal operation is able to be performed, or a KEEP-ALIVE message, through the data link 230.

In the example of FIG. 6, the back-end chip BE #1 may receive a control code and transmit a message 625 indicating that code reception is completed during a time period 620. The back-end chip BE #2 may receive a control code and transmit a code reception completion message 635 during a time period 630. The back-end chip BE #3 may receive a control code and transmit a code reception completion message 645 during a time period 640. The back-end chip BE #4 may receive a control code and transmit a code reception completion message 655 during a time period 650.

The front-end chip FE may determine whether the message indicating that control code reception is completed has been received from all back-end chips BE at the time of completion of first control code transmission (610), and repeatedly transmit the control code when the message indicating that control code reception is completed is not received from all back-end chips BE (615). In addition, when the message indicating that control code reception is completed is received from all back-end chips BE, the process may be terminated without additional transmission of control codes.

In an embodiment, the front-end chip FE may limit the number of times the control code is transmitted or may limit the control code to be repeatedly transmitted only for a preset period of time. In addition, the back-end chip that has not completed receiving the control code within the limited period of time or within the limited number of times may be determined to be in an abnormal state. In this case, the back-end chip may not be used during normal operation of the memory controller. In some embodiments, an alarm indicating the abnormal state of the second-end chip may be provided to a user.

The example of FIG. 6 shows an example in which all back-end chips BE receive the same control code. In this case, transmission of control codes to all back-end chips BE may be optimized. Even when only some of the back-end chips BE use the same control codes, the some of the back-end chips BE may receive the same control code at the same time, thereby providing significant efficiency.

Figure 7:
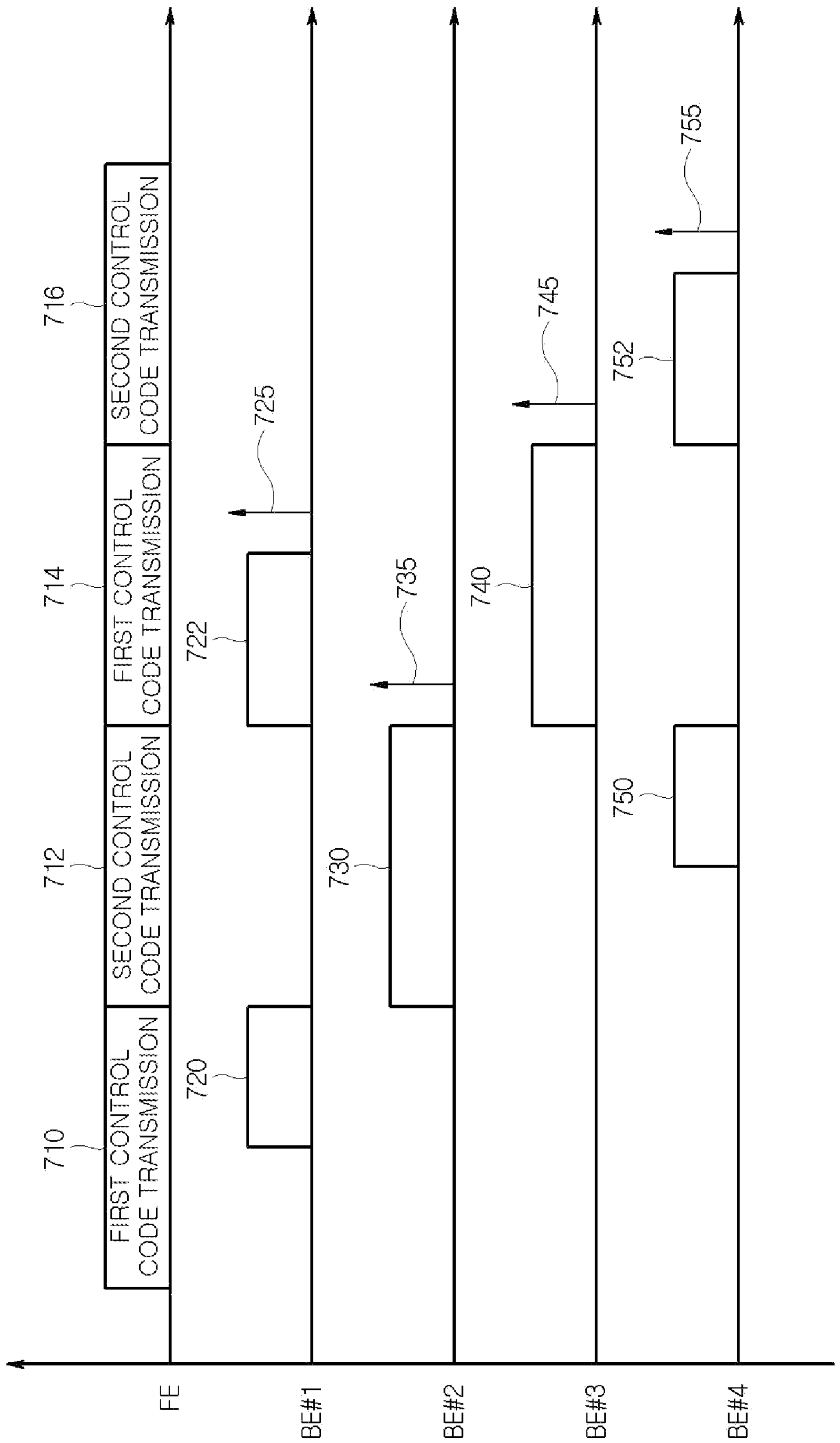
FIG. 7 is an example of a timing diagram for receiving a control code in a plurality of back-end chips using different control codes based on a first embodiment of the present disclosure.

FIG. 7 is an example of a timing diagram for receiving a control code in a plurality of back-end chips using different control codes based on a first embodiment of the present disclosure.

Referring to FIG. 7, a front-end chip FE may obtain a first control code and a second control code from a non-volatile memory 250 and sequentially transmit the first control code and the second control code. It is assumed that the first control code is for back-end chips BE #1 and BE #3 and that the second control code is for back-end chips BE #2 and BE #4. The front-end chip FE may receive a message indicating that the control codes have been received from each back-end chip BE. In an embodiment, the reception completion message for the control code may be transmitted from the back-end chip BE to the front-end chip FE through the data link 230. For example, the back-end chip BE may transmit, to the front-end chip FE, a message indicating that booting is completed, a ready message indicating that normal operation is able to be performed, or a KEEP-ALIVE message, through the data link 230.

In the example of FIG. 7, the front-end chip transmits the first control code at 710 and the second control code at 712. The transmissions of the first control code and the second control code are repeated at 714 and 716, respectively. In the example, the back-end chip BE #1 may receive a part of the first control code during a time period 720, receive the remaining part of the first control code during a time period 722 in which the first control code is repeatedly transmitted (i.e., the second transmission of the first control code), and transmit a code reception completion message 725. The back-end chip BE #2 is already ready before the second control code is transmitted at 712, so that the back-end chip BE #2 receives the entire second control code during the time period 730 and transmits a code reception completion message 735. The back-end chip BE #3 has not been ready to receive data during the first transmission of the first control code at 710 and is then ready to receive data before second transmission of the second control code at 714. During the time period 740 in which the second transmission of the second control code is performed at 714, the back-end chip BE #3 may receive the second control code and transmit a code reception completion message 745. When the back-end chip BE #4 is ready to receive data in the middle of first transmission of the second control code at 712, the back-end chip BE #4 may receive only a part of the second control code during a time period 750, receive the remaining part of the second control code during a time period 752 starting from a time point at which second transmission of the second control code is performed at 716 and transmit a code reception completion message 755.

The front-end chip FE may determine whether a code reception completion message is received from all of the back-end chips BE that are supposed to receive the second control code when the first transmission of the first control code is completed at 710, and when the code reception completion message is not received from all of the back-end chips BE that are supposed to receive the second control code, transmit the second control code at 712. In addition, the front-end chip FE may determine whether the code reception completion message is received from all of the back-end chips BE that are supposed to receive the first control code when the first transmission of the second control code is completed at 712, and when the code reception completion message is not received from all of the back-end chips BE that are supposed to receive the first control code, repeat the transmission of the first control code at 714. When the code reception completion message is received from all of the back-end chips BE that are supposed to receive the first control code, the front-end chip FE may transmit the second control code without additional transmission of control codes according to the determination of whether the message indicating that code reception completion message is received from all of the back-end chips BE. Similarly, the front-end chip FE may determine whether a code reception completion message is received from all of the back-end chips BE that are supposed to receive the second control code when the transmission of the first control code is completed at 714, and when the code reception completion message is not received from all of the back-end chips BE that are supposed to receive the control code, again transmit the second control code at 716. When the code reception completion message is received from all of the back-end chips BE that are supposed to receive the second control code, the front-end chip FE may transmit the first control code without additional transmission of control codes according to the determination of whether the code reception completion message is received from all of the back-end chips BE. The above-described operation may be terminated without additional transmission when the back-end chips BE to use control codes have received all the control codes.

Although it is described to separately manage and control the first control code and the second control code in the example of FIG. 7, in another embodiment, the first control code and the second control code are combined to form a third control code and the operation as in the embodiment of FIG. 6 may be performed. In this case, the front-end chip FE may repeatedly transmit the third control code based on determination of whether a code reception completion message has been received from all of the back-end chips BE. That is, the complexity of the front-end chip FE may be reduced compared to that of FIG. 7.

Figure 8:
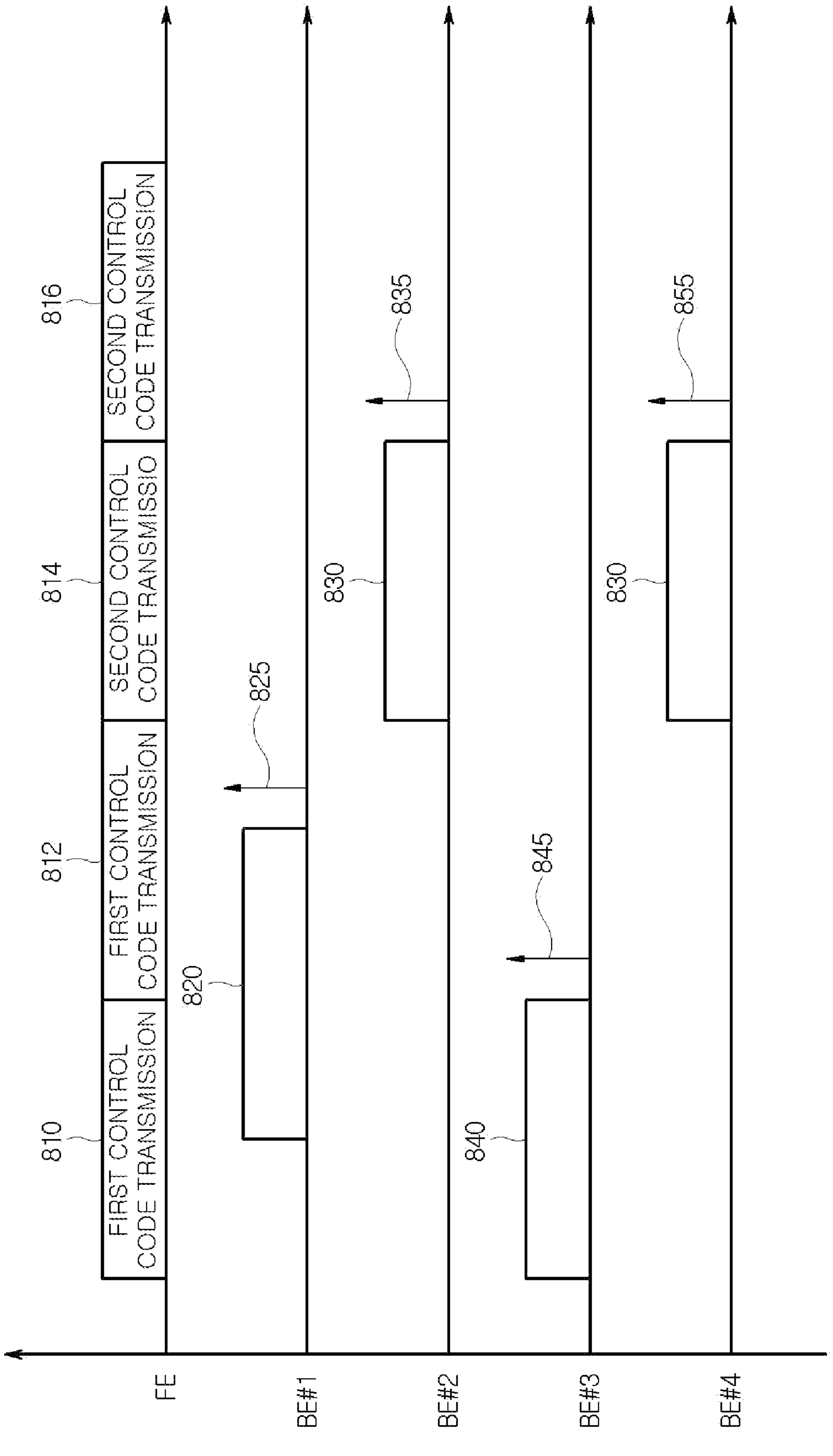
FIG. 8 is an example of a timing diagram for receiving a control code in a plurality of back-end chips using different control codes based on a second embodiment of the present disclosure.

FIG. 8 is an example of a timing diagram for receiving a control code in a plurality of back-end chips using different control codes based on a second embodiment of the present disclosure.

When a plurality of control codes including a first control code and a second control code needs to be transmitted, a method shown in FIG. 8 may repeatedly transmitting of the first control code before starting transmitting of a second control code. For example, the front-end chip FE starts the transmitting of the first control code and repeats transmitting of the control code until the message indicating that reception of the first control code is completed is received from all back-end chips using the first control code. After the message indicating that reception of the first control code is completed is received from all back-end chips using the first control code, the front-end chip FE may start transmitting the second control code. The transmitting of the second control code repeats and, when the message indicating that reception of the second control code is completed is received from all back-end chips using the second control code, all transmission operations can finish.

Referring to FIG. 8, the front-end chip FE may obtain a first control code for back-end chips from the non-volatile memory 250 and repeatedly transmit the first control code until a code reception completion message is received from all back-end chips that use the first control code. When receiving the code reception completion message from all back-end chips BE that use the first control code, the front-end chip FE may determine whether there is an additional control code to be transmitted, when there is the additional control code, obtain a second control code for back-end chips from the non-volatile memory 250 and repeatedly transmit the second control code until a reception completion message is received from all back-end chips BE that are supposed to use the second control code. When receiving the code reception completion message from all back-end chips BE that use the second control code, the front-end chip FE may determine whether there is an additional control code to be transmitted and, when there is no additional control code, finish control code transmission.

In the example of FIG. 8, a back-end chip BE #1 may receive a first control code in a time period 820 spanning the first control code transmitted twice and transmit a code reception completion message 825. A back-end chip BE #3 may receive a first control code in a time period 840 spanning the first control code transmitted twice in the time period 820 and transmit the code reception completion message 825.

After the second transmission of the first control code, the front-end chip FE may determine that a code reception completion message is received from all back-end chips BE #1 and BE #3 using the first control code, and repeatedly transmit a second control code (814, 816).

The back-end chip BE #2 and the back-end chip BE #4 are already ready before the first transmission of the second control code at 814, so that the back-end chip BE #2 and the back-end chip BE #4 may receive the entire second control code during the same time period 830 and transmit a code reception completion message 835 or 855.

When a back-end chip transmits a code reception completion message through the data link 230, the front-end chip FE is able to transmit the second control code at the second time at 816 as shown in FIG. 8 since the code reception completion message is able to be transmitted after the delay of a certain time when the control code has been received. After the second transmission of the second control code is completed, the front-end chip FE may terminate transmission of the control code.

FIG. 9 is a diagram showing an example of a structure of a control code based on embodiments of the present disclosure.

Referring to FIG. 9, each data included in a control code may be indexed with a first index and a second index. Here, the first index is an index for identify the position of data within the control code, and the second index is an index for identifying different control codes. In an embodiment, the first index and the second index may be combined to serve as one index. Here, one row of the table shown in FIG. 9 in which indexes and data are combined is called a unit code or a unit control code.

When all back-end chips use the same control code as in the embodiment of FIG. 6, only the first index may be used without the second index, which may be the same result as setting the second index to '0'.

When back-end chips use different control codes as in the embodiment of FIG. 7, one control code may be formed by making indexes included in the first control code and the second control code different, as shown in FIG. 9. The front-end chip FE may use only the first index without one second index, which may be the same result as setting the second index to '0'.

Figure 10:
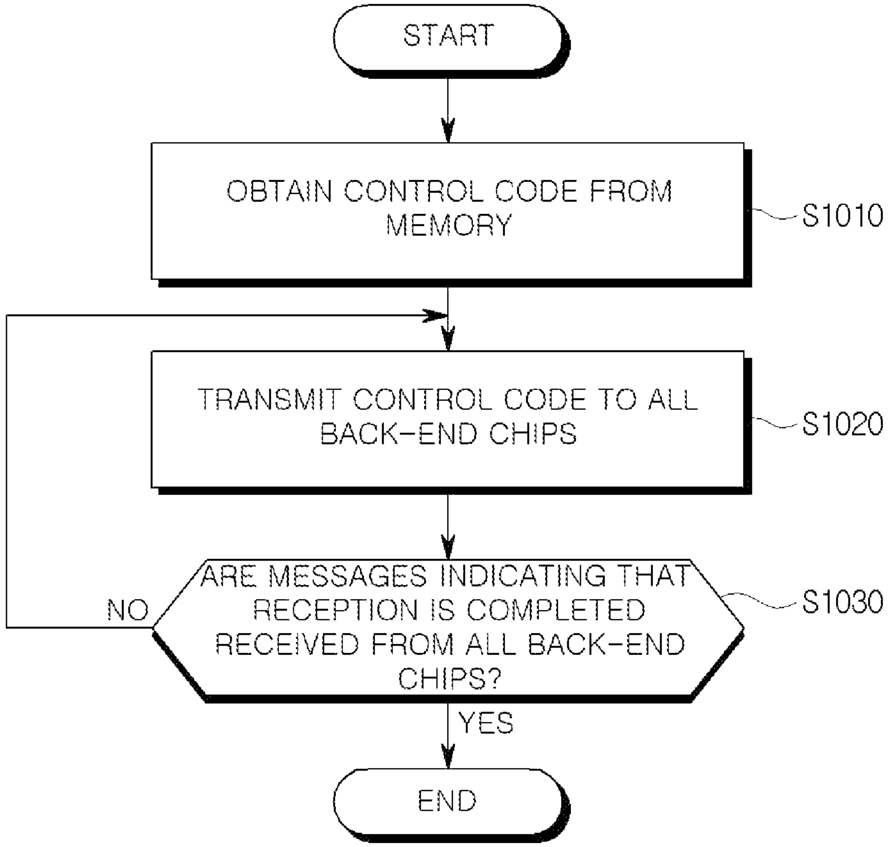
FIG. 10 is a flowchart for describing an example of an operation of transmitting a control code to a back-end chip in a front-end chip based on an embodiment of the present disclosure.

FIG. 10 is a flowchart for describing an example of an operation of transmitting a control code to a back-end chip in a front-end chip based on embodiments of the present disclosure.

Referring to FIG. 10, in operation S1010, the front-end chip 210 may obtain a control code for performing operations of the back-end chips 220 from a memory connected thereto.

In operation S1020, the front-end chip 210 may transmit the control code to all of the back-end chips 220.

In operation S1030, the front-end chip 210 may determine whether a reception completion message indicating that the control code has been received are received from all of the back-end chips 220.

When a result of the determination in operation S1030 determines that the reception completion message has not been received from at least one of the back-end chips 220, the front-end chip 210 may return to operation S1020 and then transmit the control code again. When a result of the determination in operation S1030 determines that the reception complete message has been received from all of the back-end chips 220, transmission of the control code to the back-end chips 220 may be completed.

Figure 11:
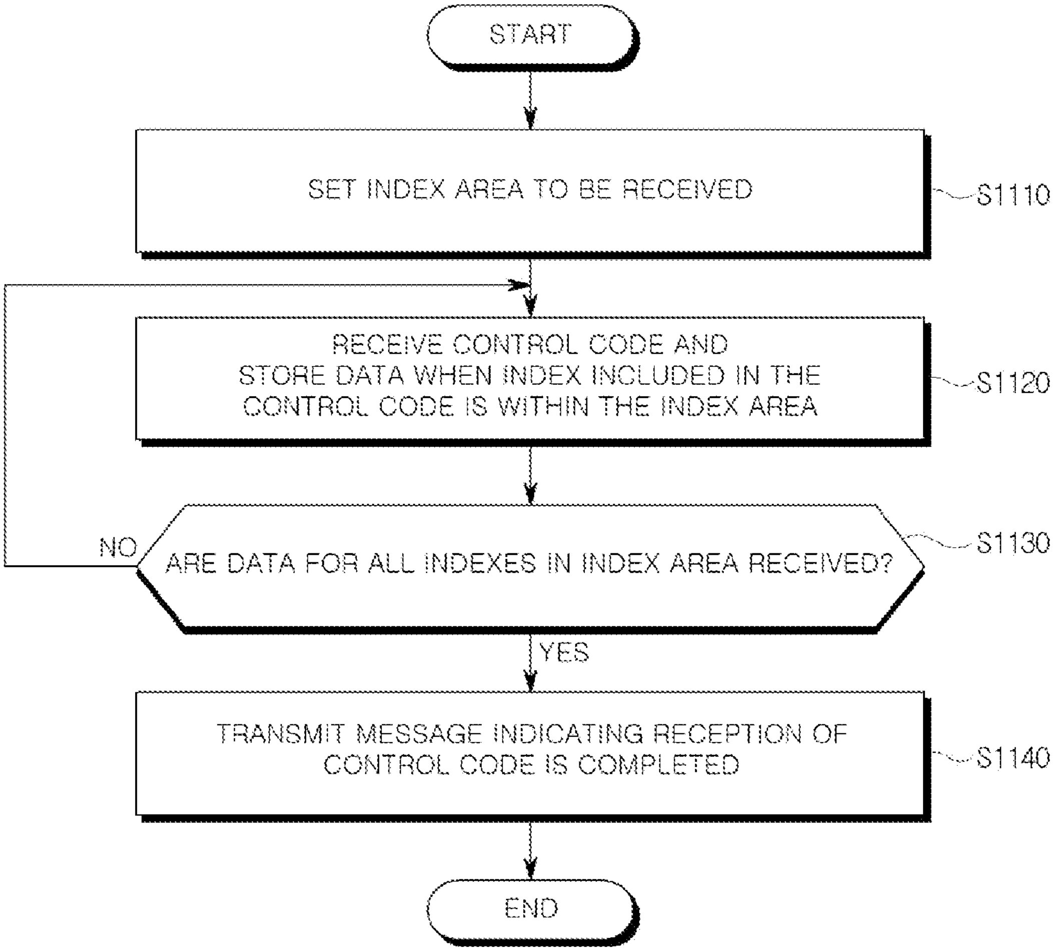
FIG. 11 is a flowchart for describing an example of an operation of receiving a control code in a back-end chip based on an embodiment of the present disclosure.

FIG. 11 is a flowchart for describing an example of an operation of receiving a control code in a back-end chip based on embodiments of the present disclosure.

Referring to FIG. 11, in operation S1110, a back-end chip may set an index area to be received. The index area to be received may be a preset value and may vary depending on a control code to be used. Referring to the example of FIG. 9, when the back-end chip uses the first control code, the index area may be 0 to K, and when the back-end chip uses the second control code, the index area may be 10 to 1M. In an embodiment, the first index and the second index may be separately set. For example, when the back-end chip uses the first control code, the first index area may be set to 0 to K, and the second index area may be set to 0. When the back-end chip uses the second control code, the first index area may be set to 0 to M, and the second index area may be set to 1.

The front-end chip FE may transmit indexes (second index and first index) and data for each clock. In the case of the first control code, the front-end chip FE may transmit K+1 indexes and data to all back-end chips through the control link 240 using K+1 clocks. In the case of the first control code, the front-end chip FE may transmit M+1 indexes and data to all back-end chips through the control link 240 using M+1 clocks.

In operation S1120, the back-end chip BE may receive the control code, extract an index and data included in the control code obtained at each clock, determine whether the index is within the index area to be received set in operation S1010, and store data when the index is within the index area to be received.

In an embodiment, when the back-end chip BE is in a receivable state while the front-end chip FE is transmitting a control code, the back-end chip BE may receive and store the control code from the middle of the index area. For example, when the index area to be received by the back-end chip is 0 to 100, a control code may be stored from the index 45. When the front-end chip FE transmits a control code such that the index increases monotonically, the back-end chip BE may receive and store a control code from 45 to 100. Then, the back-end chip BE receives the control code from 0 to 44 when the front-end chip FE transmits the control code again from the index 0.

In operation S1130, the back-end chip BE may determine whether data of all indexes within the index area has been received. When it is determined that data of all indexes has not been received, the back-end chip BE may return to operation S1120 and continue to receive the control code. When it is determined that data of all indexes has been received, the back-end chip BE may transmit a code reception completion message in operation S1140. In an embodiment, the back-end chip BE has performed booting using the received and stored control code and then transmits a message indicating that the back-end chip BE is ready to the front-end chip FE. In this case, such message indicating that the back-end chip BE is ready can be considered as the code reception completion message.

In an embodiment, in a case where the back-end chip stores data from index 45, when the back-end chip receives the control code of index 44 and stores data, that is, when the back-end chip stores data at the same index as the value obtained by subtracting one from an initial index, the back-end chip may determine that control code reception is completed. The back-end chip BE may determine whether control code reception is completed in various other ways. In one embodiment, when a parity check code is added to the control code to secure data integrity, the back-end chip BE may perform a parity check and when the parity check is passed, determine that control code reception is completed.

As described above, some embodiments of the present disclosure provide a method for each chiplet to efficiently obtain a control code such as firmware in a chiplet-based memory controller.

In some embodiments, the present disclosure provides transmission of control codes by connecting a front-end chip and a back-end chip using only one line in terms of hardware.

In some embodiments of the present disclosure, a control code may be transmitted only through data transmission in one direction from the front-end chip to the back-end chip through a single line as described above.

Some embodiments of the present disclosure provide a method of arbitrarily transmitting a control code without any additional controls, such as the front-end chip determining whether the back-end chip is able to receive data or synchronizing with the back-end chip, and without any state information on the back-end chip.

Some embodiments of the present disclosure provide a method by which the back-end chip simply receives a control code without complicated control.

Accordingly, it is possible to minimize the number of lines for transmitting a control code to a plurality of back-end chips.

In addition, some embodiments of the present disclosure can reduce complexity and increase a speed by minimizing synchronization overhead in transmitting a control code from a front-end chip to a plurality of back-end chips.

Although a chiplet-based structure and a method for transmitting a control code (firmware) in the chiplet-based structure have been described based on a memory controller of a storage device, it is noted that the above description can be equally applied to any electronic device implemented with a chiplet-based structure.

In the above description, chips having the chiplet-based structure have been referred to as a front-end chip and a plurality of back-end chips, but the embodiments of the present disclosure can be applied to various chips without being limited thereto. For example, the method of transmitting a control code (firmware) proposed in the present disclosure can be effectively used or applied even when the front-end chip is generally called a first chip performing a first operation and the back-end chip is generally called a second chip performing a second operation.

According to various embodiments of the present disclosure, it is possible to reduce the number of input/output pins required to transmit a control code to each chiplet, and optimize complexity and speed for control code transmission.

While this patent document contains many specifics, these should not be construed as limitations on the scope of any subject matter or of what may be claimed, but rather as descriptions of features that may be specific to particular embodiment of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is:

1. A memory controller comprising:

a first chip configured to perform a first operation of the memory controller;

a plurality of second chips configured to perform a second operation of the memory controller;

a plurality of data links configured to connect the first chip and each of the plurality of second chips on a one-to-one basis and provide data transmission between the first chip and each of the plurality of second chips;

a control link connected to the first chip and the plurality of second chips and configured to transmit a control code for performing the second operation of the plurality of second chips;

a memory connected to the first chip and configured to store the control code, wherein the first chip is configured to:

obtain the control code from the memory; and transmit the control code to the plurality of second chips at a same time through the control link, wherein transmitting of the control code is repeated until reception completion messages for the control code are received from all of the plurality of second chips, wherein, in response to power being applied to at least one of the plurality of second chips during a first transmission of the control code, the at least one of the plurality of second chips is configured to receive the control code starting from a middle part of the first transmission, and the at least one of the second chips is further configured to receive a front part of the control code during a second transmission subsequent to the first transmission to finish reception of an entire control code.

2. The memory controller of claim 1, wherein the control link is formed in a way that the first chip and all the plurality of second chips are connected to at least one line in a bus form, and configured to support one-way transmission from the first chip to the plurality of second chips.

3. The memory controller of claim 2, wherein each of the plurality of second chips is configured to transmit a corresponding reception completion message to the first chip through a corresponding data link connected to the first chip after a reception of the control code is completed.

4. The memory controller of claim 1, wherein the first chip is further configured to transmit the control code at a random time without obtaining state information on each of the plurality of second chips and without exchanging, with the plurality of second chips, information indicating that the control code is to be transmitted.

5. The memory controller of claim 1, wherein the control code includes a plurality of unit codes, each unit code including data and an index indicating a position in the control code.

6. The memory controller of claim 5, wherein the at least one of the plurality of second chip is configured to:

set an index area of a control code to be used;

when an index of a unit code included in the control code transmitted by the first chip is included in the index area, recognize the unit code as a control code to be used and store the unit code or data in the unit code at a position corresponding to the index in the unit code; and transmit a corresponding reception completion message to the first chip after data has been stored for all indexes included in the index area.

7. The memory controller of claim 6, wherein the at least one of the plurality of second chips is configured to execute the control code to perform the second operation.

8. The memory controller of claim 1, wherein the first chip is configured to, in response to a reception of a message according to the second operation through one of the plurality of data links connected to a corresponding one of the plurality of second chips, recognize the message as a corresponding one of the reception complete message.

* * * * *